United States Patent
Lee

(10) Patent No.: US 11,437,034 B2
(45) Date of Patent: Sep. 6, 2022

(54) REMOTE CONTROL METHOD AND APPARATUS FOR AN IMAGING APPARATUS

(71) Applicant: LG ELECTRONICS INC., Seoul (KR)

(72) Inventor: Kwangyong Lee, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 16/806,842

(22) Filed: Mar. 2, 2020

(65) Prior Publication Data
US 2021/0158815 A1    May 27, 2021

(30) Foreign Application Priority Data
Nov. 21, 2019    (KR) .......................... 10-2019-0150648

(51) Int. Cl.
*G10L 15/22*    (2006.01)
*G06K 9/62*    (2022.01)
(Continued)

(52) U.S. Cl.
CPC ............ *G10L 15/22* (2013.01); *G06K 9/6215* (2013.01); *G06N 3/0454* (2013.01); *G06N 3/088* (2013.01);
(Continued)

(58) Field of Classification Search
CPC ..... G10L 15/22; G10L 15/16; G10L 15/1815; G10L 2015/223; G10L 15/30;
(Continued)

(56) References Cited

U.S. PATENT DOCUMENTS

2020/0004291 A1\* 1/2020 Wexler .................... G10L 15/10
2020/0125322 A1\* 4/2020 Wilde ..................... G06F 1/163
(Continued)

FOREIGN PATENT DOCUMENTS

KR    20160061176 A    \*    5/2016

OTHER PUBLICATIONS

Xu, T., Zhang, P., Huang, Q., Zhang, H., Gan, Z., Huang, X., & He, X. (2018). Attngan: Fine-grained text to image generation with attentional generative adversarial networks. In Proceedings of the IEEE conference on computer vision and pattern recognition (pp. 1316-1324). (Year: 2018).\*

(Continued)

*Primary Examiner* — Daniel C Washburn
*Assistant Examiner* — Athar N Pasha
(74) *Attorney, Agent, or Firm* — Birch, Stewart, Kolasch & Birch, LLP

(57) ABSTRACT

Disclosed are a method and apparatus for remotely controlling an imaging apparatus. A method of controlling a remote control apparatus includes converting a spoken utterance of a user into an utterance text or receiving the utterance text, applying a generative model-based first learning model to the utterance text and generating an image having attributes corresponding to a context of the utterance text, and externally transmitting the image and the utterance text. In addition, a method of controlling an imaging apparatus includes receiving a first input including text or speech data and a second input including a first image, capturing at least one second image based on the first input, comparing the first image and the second image, and transmitting the second image in response to a comparison result of the first image and the second image.

14 Claims, 8 Drawing Sheets

(51) Int. Cl.
*G10L 15/16* (2006.01)
*G10L 15/18* (2013.01)
*G10L 15/30* (2013.01)
*G06N 3/04* (2006.01)
*G06N 3/08* (2006.01)
*G10L 15/24* (2013.01)
*G06V 10/40* (2022.01)
*H04L 67/10* (2022.01)

(52) U.S. Cl.
CPC .............. *G06V 10/40* (2022.01); *G10L 15/16* (2013.01); *G10L 15/1815* (2013.01); *G10L 15/24* (2013.01); *G10L 15/30* (2013.01); *G10L 2015/223* (2013.01); *H04L 67/10* (2013.01)

(58) Field of Classification Search
CPC ........... G10L 15/24; G10L 15/26; G06K 9/46; G06K 9/6215; G06K 9/6271; G06N 3/0454; G06N 3/088; G06N 3/084; G06N 3/08; G06N 3/0445; G06N 3/0472; H04L 67/10; H04L 67/125; G06T 11/60; H04N 5/23206; G06V 10/40; G06V 10/82; G06F 40/216; G06F 40/284; G06F 40/289; G06F 40/30; G06F 40/44; G06F 3/167

See application file for complete search history.

(56) References Cited

U.S. PATENT DOCUMENTS

2020/0126584 A1* 4/2020 Huang ................ G10L 15/1815
2020/0184955 A1* 6/2020 Patel ........................ G10L 25/51
2021/0065702 A1* 3/2021 Fink ......................... G06N 3/08
2021/0217409 A1* 7/2021 Choi ................... G10L 15/1822

OTHER PUBLICATIONS

Zhang, H., Xu, T., Li, H., Zhang, S., Wang, X., Huang, X., & Metaxas, D. N. (2017). Stackgan: Text to photo-realistic image synthesis with stacked generative adversarial networks. In Proceedings of the IEEE international conference on computer vision (pp. 5907-5915). (Year: 2017).*
KR 20160061176A1 translation (Year: 2016).*

* cited by examiner

REMOTE CONTROL METHOD AND APPARATUS FOR AN IMAGING APPARATUS

CROSS-REFERENCE TO RELATED APPLICATION

This present application claims the benefit of priority to Korean Patent Application No. 10-2019-0150648, entitled "Remote Control Method and Apparatus for an Imaging Apparatus" filed on Nov. 21, 2019, in the Korean Intellectual Property Office, the entire disclosure of which is incorporated herein by reference.

BACKGROUND

Technical Field

The present disclosure relates to a remote control method and apparatus for an imaging apparatus for executing an installed artificial intelligence (AI) algorithm and/or machine learning algorithm to remotely control the imaging apparatus.

Description of Related Art

A generative adversarial network (GAN) is a deep neural network structure including two networks. The GAN generates a new data instance through one neural network referred to as a generator and evaluates the veracity of data through a discriminator that is another neural network. That is, the discriminator determines whether each checked data instance is an actual training data set or not. Thus, the discriminator (discrimination algorithm) maps a feature to a label. That is, the discriminator focuses solely on a correlation between the feature and the label. In contrast, the generator (generation algorithm) operates in an opposite way. The generation algorithm is a method of predicting a feature from a specific label instead of predicting a label from a given specific feature.

The above-described background technology is technical information that the inventors hold for the derivation of the present disclosure or that the inventors acquired in the process of deriving the present disclosure. Thus, the above-described background technology may not necessarily be regarded as known technology disclosed to the general public prior to the filing of the present application.

SUMMARY OF THE INVENTION

An aspect of the present disclosure is to execute an installed artificial intelligence (AI) algorithm and/or machine learning algorithm to remotely control the imaging apparatus.

Another aspect of the present disclosure is to effectively process an instruction of a remote imaging apparatus using an image generated based on generative models positioned at different places as an input for control of a remote imaging apparatus.

Another aspect of the present disclosure is to generate an image based on a spoken utterance of a user by a generative model-based device and to match an image captured by a discriminative model-based device with an image generated by a generative model.

Another aspect of the present disclosure is to generate an image having attributes corresponding to a context of an utterance text by a generative model-based device.

Another aspect of the present disclosure is to generate an image based on a spoken utterance of a user by the generative model-based device and to repeatedly perform a procedure of discriminating between an actual image and an image generated through an internal discrimination model to train the generative model.

Still another aspect of the present disclosure is to perform text classification and image classification based on a spoken utterance of a user based on the discriminative model-based device.

The present disclosure is not limited to what has been described above, and other aspects not mentioned herein will be apparent from the following description to one of ordinary skill in the art to which the present disclosure pertains. Further, it is understood that the objects and advantages of the present disclosure may be embodied by the means and a combination thereof in claims.

A remote control method of an imaging apparatus according to an embodiment of the present disclosure may execute an AI algorithm and/or machine learning algorithm installed in a generative model-based device to remotely control a discriminative model-based device.

In detail, a method of controlling a remote control apparatus according to an embodiment of the present disclosure may include converting a spoken utterance of a user into an utterance text or receiving an utterance text, applying a generative model-based first learning model to an utterance text and generating an image having attributes corresponding to a context of an utterance text, and externally transmitting the image and an utterance text.

The method of controlling a remote control apparatus according to this embodiment of the present disclosure may extract attention of an utterance text from a generative model-based device to generate an image having attributes corresponding to context, and may repeatedly perform a procedure of discriminating between the generated image and an actual image through an internal discrimination model so as to train a generative model, thereby enhancing the performance of an image generative model of the remote control apparatus.

A method of controlling an imaging apparatus according to another embodiment of the present disclosure may include receiving a first input including text or speech data and a second input including a first image, capturing at least one second image based on the first input, comparing the first image and the second image, and transmitting the second image in response to a comparison result of the first image and the second image.

The method of controlling an imaging apparatus according to this embodiment of the present disclosure may perform text classification and image classification based on a spoken utterance of a user in the discriminative model, and may more accurately determine instruction intent of the user based on the text information and the image information.

In addition, in order to implement the present disclosure, there may be further provided other methods, other systems, and a computer-readable recording medium having a computer program stored thereon to execute the methods.

Other aspects and features in addition as those described above will become clear from the accompanying drawings, claims, and the detailed description of the present disclosure.

According to embodiments of the present disclosure, an AI algorithm and/or a machine learning algorithm installed in a device may be executed while a generative model-based device and a discriminative model-based device that are positioned at different places perform remote control while interacting with each other, thereby effectively processing a speech instruction.

The generative model-based device may generate an image based on the spoken utterance of a user, may match an image captured by the discriminative model-based device with an image generated by the generative model, may provide the matching result to the generative model-based device, and thus devices positioned far away from each other may be effectively controlled to enhance user satisfaction.

The generative model-based device may extract attention of an utterance text to generate an image having attributes corresponding to a context of the utterance text, thereby enhancing the accuracy of the image generating result.

The generative model-based device may generate an image based on a spoken utterance of a user, and may repeatedly perform a procedure of discriminating an actual image and an image generated through an internal discrimination model so as to train the generative model, and thus may compensate for a region that is not covered by training data, thereby enhancing performance of the generative model.

The discriminative model-based device may perform text classification and image classification based on the utterance text, may combine the results of the text and image classification, and may perform a specific intended operation. Accordingly, the discriminative model-based device can efficiently and accurately determine the instruction intent of the user using as much information as possible.

The remote control apparatus and the imaging apparatus may be controlled through 5G network-based communication, and thus data may be rapidly processed, thereby further enhancing performance of a control system of the remote control apparatus and the imaging apparatus.

The effects of the present disclosure are not limited to those mentioned above, and other effects not mentioned may be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
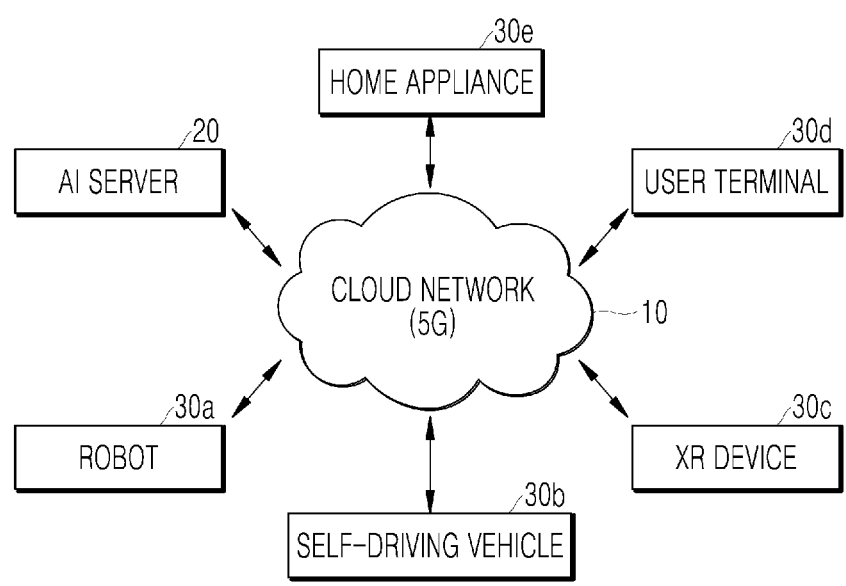
FIG. 1 is a diagram illustrating a control system environment of a remote control apparatus and an imaging apparatus based on an artificial intelligence (AI) including a cloud network according to an embodiment of the present disclosure.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The embodiments disclosed below are provided so that this disclosure will be thorough and complete and will fully convey the scope of the present disclosure to those skilled in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. It must be noted that as used herein and in the appended claims, the singular forms "a," "an," and "the" include the plural references unless the context clearly dictates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

According to the present embodiment, a remote control apparatus may be embodied in a control system environment of a remote control apparatus, and an imaging apparatus may be embodied in a control system environment of an imaging apparatus. However, in the present embodiment, the case in which the remote control apparatus and the imaging apparatus are embodied in the control system environment of the remote control apparatus and the imaging apparatus will be described.

FIG. 1 is a diagram illustrating a control system environment of a remote control apparatus and an imaging apparatus based on an artificial intelligence (AI) including a cloud network according to an embodiment of the present disclosure.

Referring to FIG. 1, the control system environment of the remote control apparatus and the imaging apparatus may include an AI server 20, a robot 30a, a self-driving vehicle 30b, an extended reality (XR) device 30c, a user terminal 30d or a home appliance 30e, and a cloud network 10. In this case, in the control system environment of the remote control apparatus and the imaging apparatus, at least one of the AI server 20, the robot 30*a*, the self-driving vehicle 30*b*, the XR device 30*c*, the user terminal 30*d*, or the home appliance 30*e* may be connected to the cloud network 10. Here, the robot 30*a*, the self-driving vehicle 30*b*, the XR device 30*c*, the user terminal 30*d*, the home appliance 30*e*, or the like, to which AI technologies are applied, may be referred to as AI devices 30*a* to 30*e*.

The robot 30*a* may refer to a machine which automatically handles a given task by its own ability, or which operates autonomously. In particular, a robot having a function of recognizing an environment and performing an operation according to its own judgment may be referred to as an intelligent robot. Robots 30*a* may be classified into industrial, medical, household, and military robots, according to the purpose or field of use.

The self-driving vehicle 30*b* refers to a vehicle which travels without manipulation of a user or with minimal manipulation of the user, and may also be referred to as an autonomous-driving vehicle. For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set. In this case, an autonomous vehicle may be considered as a robot with an autonomous driving function.

The XR device 30*c* refers to a device using extended reality (XR), which collectively refers to virtual reality (VR), augmented reality (AR), and mixed reality (MR). VR technology provides objects or backgrounds of the real world only in the form of CG images. AR technology provides virtual CG images overlaid on the physical object images, and MR technology employs computer graphics technology to mix and merge virtual objects with the real world. XR technology may be applied to a head-mounted display (HMD), a head-up display (HUD), a mobile phone, a tablet PC, a laptop computer, a desktop computer, a TV, digital signage, and the like. A device employing XR technology may be referred to as an XR device.

The user terminal 30*d* may access a control system application of the remote control apparatus and the imaging apparatus or a control system site of the remote control apparatus and the imaging apparatus, and then may receive a service for an operation or control of a control system of the remote control apparatus and the imaging apparatus through an authentication procedure. In the present embodiment, the user terminal 30*d* that completes the authentication procedure may operate and control the control system of the remote control apparatus and imaging apparatus. In the present embodiment, the user terminal 30*d* may be a desktop computer, a smartphone, a notebook, a tablet PC, a smart TV, a cell phone, a personal digital assistant (PDA), a laptop, a media player, a micro server, a global positioning system (GPS) device, an electronic book terminal, a digital broadcast terminal, a navigation device, a kiosk, an MP3 player, a digital camera, a home appliance, and other mobile or immobile computing devices operated by the user, but is not limited thereto. In addition, the user terminal 30*d* may be a wearable terminal having a communication function and a data processing function, such as a watch, glasses, a hair band, and a ring. The user terminal 30*d* is not limited thereto. Any terminal that is capable of performing web browsing may be used without limitation.

The home appliance 30*e* may include any one of all electronic devices provided in a home. In particular, the home appliance 30*e* may include a terminal capable of implementing, for example, voice recognition and artificial intelligence, and a terminal for outputting at least one of an audio signal and a video signal. In addition, the home appliance 30*e* may include various home appliances (for example, a washing machine, a drying machine, a clothes processing apparatus, an air conditioner, or a kimchi refrigerator) without being limited to specific electronic devices.

The cloud network 10 may include part of the cloud computing infrastructure or refer to a network existing in the cloud computing infrastructure. Here, the cloud network 10 may be constructed by using the 3G network, 4G or long term evolution (LTE) network, or a 5G network. That is, the devices 30*a* to 30*e* and 20 included in the control system environment of the remote control apparatus and the imaging apparatus may be connected to each other through the cloud network 10. In particular, each individual device (30*a* to 30*e*, 20) may communicate with each other through a base station, but may also communicate directly to each other without relying on the base station.

The cloud network 10 may include, for example, wired networks such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present disclosure is not limited thereto. Furthermore, the cloud network 10 may transmit and receive information using short-range communications or long-distance communications. The short-range communication may include Bluetooth®, radio frequency identification (RFID), infrared data association (IrDA), ultra-wideband (UWB), ZigBee, and wireless-fidelity (Wi-Fi) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The cloud network 10 may include connection of network elements such as hubs, bridges, routers, switches, and gateways. The cloud network 10 may include one or more connected networks, including a public network such as the Internet and a private network such as a secure corporate private network. For example, the network may include a multi-network environment. The access to the cloud network 10 can be provided via one or more wired or wireless access networks. Furthermore, the cloud network 10 may support 5G communication and/or an Internet of Things (IoT) network for exchanging and processing information between distributed components such as objects.

The AI server 20 may include a server performing AI processing and a server performing computations on big data. The AI server 20 may be a database (DB) server for providing big data required to apply various AI algorithms, and data for operating the control system environment of the remote control apparatus and the imaging apparatus. In addition, the AI server 20 may include a web server or an application server for remotely controlling an operation of the control system of the remote control apparatus and the imaging apparatus using the control system application of the remote control apparatus and the imaging apparatus or a control system web browser of the remote control apparatus and the imaging apparatus, which is installed in the user terminal 30*d*.

The AI server 20 may be connected to at least one of the robot 30*a*, the self-driving vehicle 30*b*, the XR device 30*c*, the user terminal 30*d*, or the home appliance 30*e*, which is an AI device included in the control system environment of the remote control apparatus and the imaging apparatus through the cloud network 10, and may assist in at least some of the AI processing of the connected AI devices 30a to 30e. Here, the AI server 20 may train the AI network according to a machine learning algorithm instead of the AI devices 30a to 30e, and may directly store a learning model or transmit the learning model to the AI devices 30a to 30e. Here, the AI server 20 may receive input data from the AI device 30a to 30e, infer a result value from the received input data by using the learning model, generate a response or control command based on the inferred result value, and transmit the generated response or control command to the AI device 30a to 30e. Similarly, the AI device 30a to 30e may infer a result value from the input data by employing the learning model directly and generate a response or control command based on the inferred result value.

Artificial intelligence (AI) is an area of computer engineering science and information technology that studies methods to make computers mimic intelligent human behaviors such as reasoning, learning, and self-improving.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. Specifically, machine learning can be a technology for researching and constructing a system for learning, predicting, and improving its own performance based on empirical data and an algorithm for the same. Machine learning algorithms, rather than only executing rigidly set static program commands, may take an approach that builds models for deriving predictions and decisions from inputted data.

Figure 2:
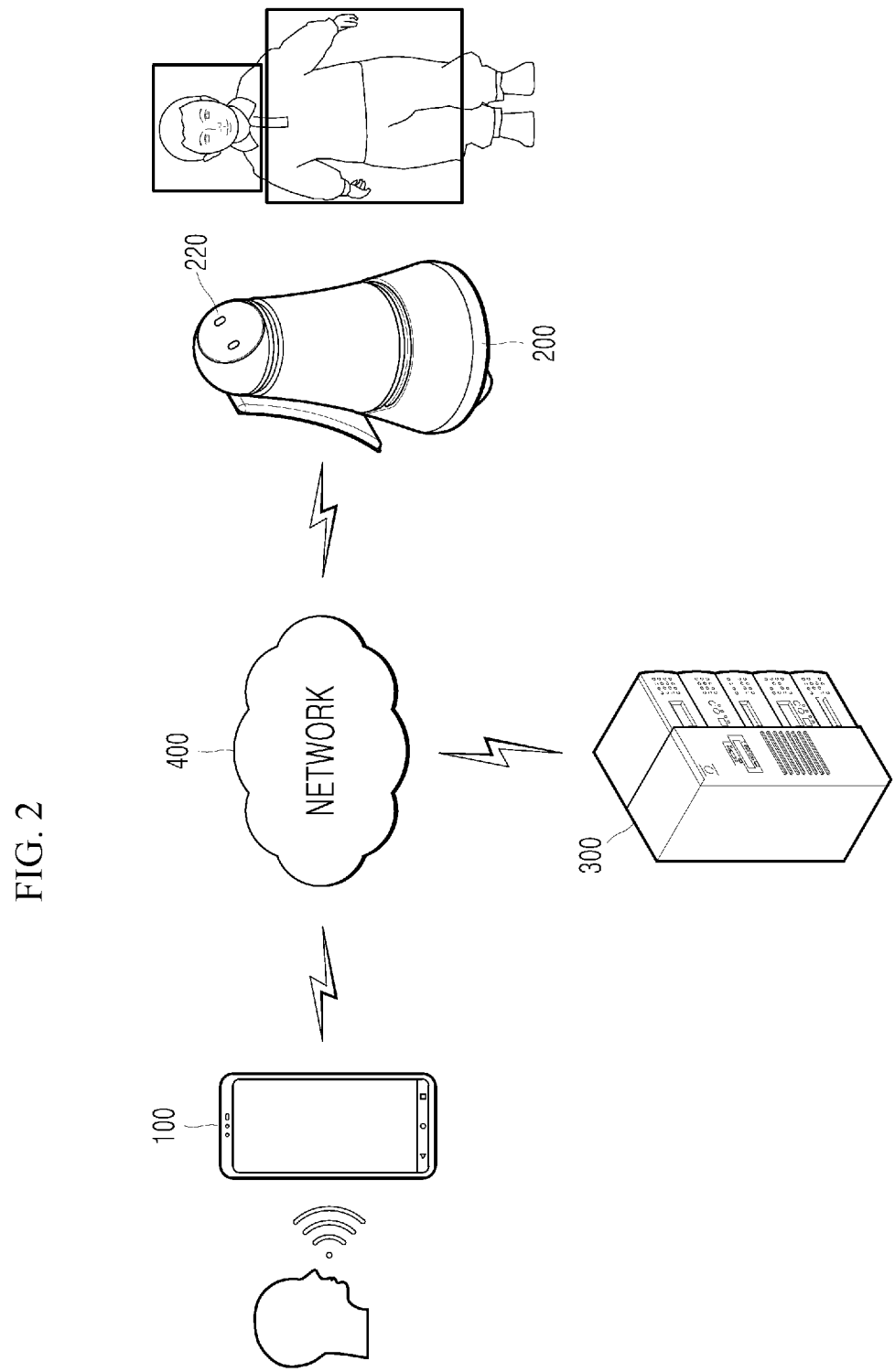
FIG. 2 is a schematic diagram for explaining a control system communication environment of a remote control apparatus and an imaging apparatus according to an embodiment of the present disclosure.

FIG. 2 is a schematic diagram for explaining a control system communication environment of a remote control apparatus and an imaging apparatus according to an embodiment of the present disclosure. Description overlapping with that of FIG. 1 will be omitted.

Referring to FIG. 2, the control system of the remote control apparatus and the imaging apparatus may include a remote control apparatus 100, an imaging apparatus 200, a server 300, and a network 400. The remote control apparatus 100, the imaging apparatus 200, and the server 300 may be connected to each other in a 5G communication environment.

In the present embodiment, the control system of the remote control apparatus and the imaging apparatus may include the remote control apparatus 100 for converting uttered speech of a user into an utterance text or receiving an utterance text, and the imaging apparatus 200 for receiving a first input including text or speech data and a second input including a first image and capturing at least one second image based on the first input. In addition, the control system of the remote control apparatus and the imaging apparatus may include the server 300 for applying a first learning model based on a generative model to the utterance text received through the remote control apparatus 100 to generate an image having attributes corresponding to context of an utterance text, and transmitting the image and an utterance text to the imaging apparatus 200. The server 300 may compare the first image and the second image and may transmit the second image to the remote control apparatus 100 in response to a comparison result of the first image and the second image.

However, in the present embodiment, the remote control apparatus 100 may apply the first learning model based on the generative model to an utterance text to generate an image having attributes corresponding to the context of an utterance text and may transmit the image and an utterance text to the imaging apparatus 200 and/or the server 300. The imaging apparatus 200 may compare the first image and the second image and may transmit the second image to the remote control apparatus 100 and/or the server 300 in response to the comparison result of the first image and the second image.

That is, in the present embodiment, the remote control apparatus 100 and the imaging apparatus 200, which are positioned at different places, may receive a single speech input, and the remote control apparatus 100 may include a generative model for text-to-image conversion to generate an image in response to the input speech. The imaging apparatus 200 may receive an image generated by the remote control apparatus 100 along with a speech input from the remote control apparatus 100 as input data, may output the input data as a result through a discriminative model, may complete execution of an action, and then may return the result to the remote control apparatus 100. That is, the present embodiment relates to control of the imaging apparatus 200 that is far away from the remote control apparatus 100 formed by coupling the image generative model and the speech recognition model. That is, the present embodiment relates to an apparatus that includes two machine learning models spaced apart from each other at two places, has a generative model coupled to one side and a discriminative model coupled to the other side to very effectively process a speech instruction while performing two-way communication.

In more detail, the remote control apparatus 100 may include the speech recognition model and the first learning model, and may include various electronic devices for performing a speech recognition function, for example, a smartphone, an AI speaker, or a communication robot with an AI function installed therein.

In this case, the first learning model may be an image generative model trained to generate text as an image. That is, in the present embodiment, the remote control apparatus 100 may receive a spoken utterance of a user, may perform speech recognition to convert the speech into an utterance text, and may generate an image based on an utterance text. However, in the present embodiment, an utterance text converted from an external device may be input, or text data itself may be inputted from a user.

In the present embodiment, speech recognition may refer to a series of procedures of receiving utterance information of the user and providing a speech recognition service through recognition and analysis. Here, the speech recognition service may include receiving utterance information of the user to distinguish a wake-up word and the spoken utterance, and outputting a result of executing a speech recognition process on the utterance information so that the result may be recognized by the user.

In this embodiment, the utterance information may include a wake-up word and a spoken utterance. The wake-up word may be a specific command that activates the speech recognition functionality of the remote control device 100. It is necessary to include the start word in the speech voice to activate the voice recognition function. When the start word is not included in the speech voice, the voice recognition function may be maintained in a deactivated state (e.g., a sleep mode). Such a wake-up word may be preset and stored in a memory (150 in FIG. 4) that will be described below.

Furthermore, the spoken utterance, which is processed after the speech recognition functionality of the remote control device 100 is activated by the wake-up word, may include a voice command that may be substantially processed by the remote control device 100 to generate an output. For example, when uttered information of a user is "Hi, LG! Find a child.", a driving language may be "Hi, LG!" and a spoken utterance may be "Find a child.". The remote control apparatus 100 may determine presence of the driving language from the uttered information of the user and may analyze the uttered speech to control the remote control apparatus 100 and to also control the imaging apparatus 200.

In this case, the remote control apparatus 100 may convert the spoken utterance of the user into an utterance text. For example, the remote control apparatus 100 may convert the spoken utterance into an utterance text through a speech to text (STT) algorithm. The remote control apparatus 100 may perform natural language processing on an instruction of an utterer, which is changed to the text, to analyze the meaning of the instruction, and accordingly, may generate a response message corresponding to the utterance text.

However, in the present embodiment, the remote control apparatus 100 may perform a procedure of generating an image based on an utterance text, and may transmit an utterance text to the imaging apparatus 200.

The remote control apparatus 100 may apply the generative model-based first learning model to an utterance text to generate an image having attributes corresponding to an utterance text. In this case, the first learning model may be a first learning model trained to output an image having attributes corresponding to context of an input using text or speech as the input, and may be a generative model-based learning model including any one of a generative adversarial network (GAN), a conditional GAN (cGAN), a deep convolution GAN (DCGAN), an auto-encoder, or a variational auto-encoder (VAE). GAN is a machine learning method in which two different artificial intelligences, a generator and a discriminator, improve performance through competing with each other. The generator may be a model generating new data that generates new data based on true data. That is, the generator may be a deep learning scheme of forming data of a desired specific distribution from an arbitrary random (normal distribution) data. The discriminator may be a model recognizing patterns in data that determines whether input data is from the true data or from the new data generated by the generator. That is, the discriminator may be a deep learning scheme of receiving a specific image or text data (specific data distribution) as an input and classifying the input. Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

That is, in the present embodiment, the generator may generate fake image data having attributes corresponding to a context of inputted text or speech. When receiving image data, the discriminator may determine whether the image data is pre-inputted training or generated image data.

Here, the context may refer to situation information of a user at a moment at which the user utters an instruction. That is, the context may be information indicating a situation in which the user utters the corresponding instruction. In particular, current context information of the user may refer to situation information of the user at the moment in which the user utters speech input. For example, when the remote control apparatus 100 directly acquires a speech input through an input interface 120 (see FIG. 4), current context information may refer to situation information of the user at the moment of obtaining the speech input. When the remote control apparatus 100 receives a speech input from an external electronic device through a first transceiver 110 (see FIG. 4), current context information of the user may include situation information of the user when the external electronic device obtains the speech input.

The context information may include various types of information indicating a situation of the user. For example, the current context information of the user may include at least one of a time at which the user utters a speech input, a place where the user utters the speech input, whether the user is moving, a moving speed of the user, or information on a device that is being used by the user. The remote control apparatus 100 may collect the current context information of the user through a first sensor 160 (see FIG. 4) and/or may receive the current context information of the user from an electronic device owned by the user through the first transceiver 110.

The imaging apparatus 200 may be a moveable robot. The imaging apparatus 200 may include a second sensor 220 and may interact with the user through the second sensor 220. The second sensor 220 may include a camera and a microphone, and the imaging apparatus 200 may recognize the user through the camera and may receive a speech instruction from the user through the microphone.

In particular, the imaging apparatus 200 may acquire and analyze the user utterance text or spoken utterance, may classify an instruction indicated by user utterance as at least one action, and may determine a final action by analyzing user intent among classified actions. The imaging apparatus 200 may execute the final action, may generate a response based on the result, and may transmit the response to the remote control apparatus 100 and/or the server 300 to output the response to the user.

For example, the imaging apparatus 200 may perform an action of photographing children within a predetermined space in order to search for a missing child and determining whether the photographed children correspond to the missing child. Here, the action may be a task performed by the imaging apparatus 200 in order to perform the instruction indicated by the speech input and the speech input may include a named entity that is a target of the action. During a procedure of processing speech, the imaging apparatus 200 may communicate with the server 300 through the network 400. The server 300 may be a server calculation system for performing natural language processing or a training calculation system for generating a neural network model for language processing. In addition, the speech processing procedure of the imaging apparatus 200 may be embodied in the same way as the speech recognition procedure of the remote control apparatus 100, and thus a detailed description thereof will be described.

The imaging apparatus 200 that is embodied as a robot may capture an image and may communicate with the user while moving in an indoor space. Although FIG. 2 illustrates the case in which the imaging apparatus 200 is embodied as a robot, the imaging apparatus 200 may be embodied as various electronic devices such as an AI speaker, a smartphone, a tablet PC, or a computer.

Figure 3:
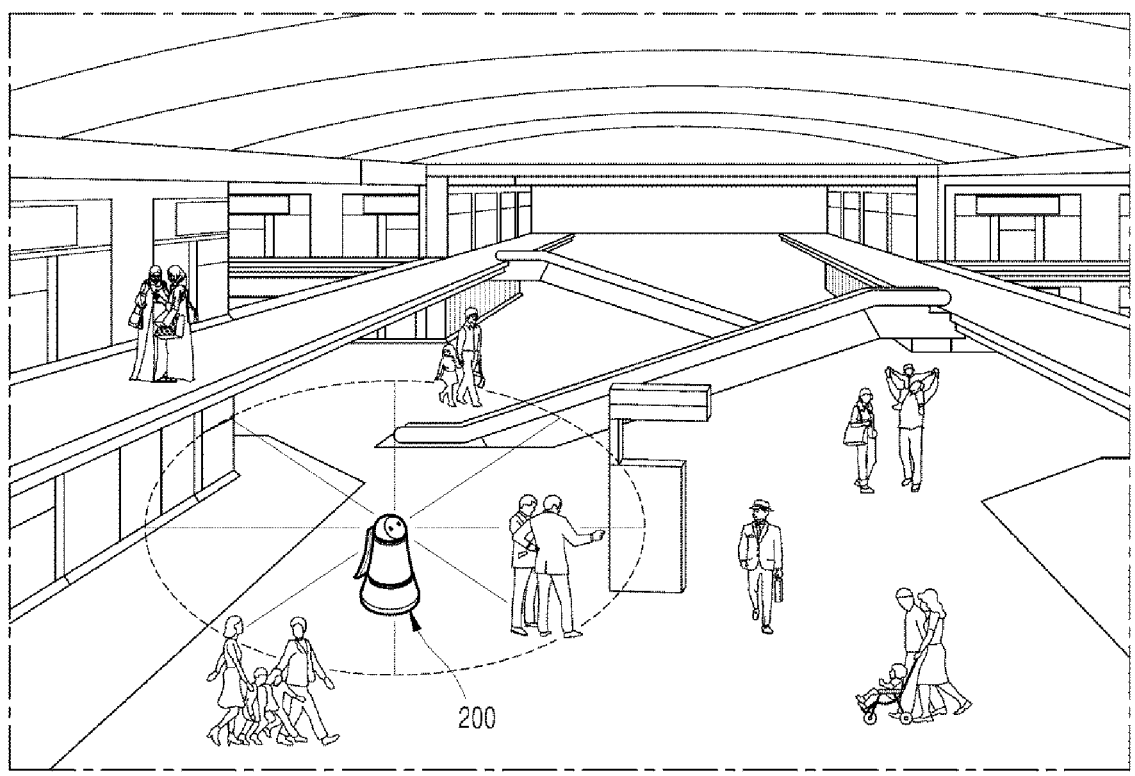
FIG. 3 is a diagram illustrating an example of an imaging apparatus according to an embodiment of the present disclosure.

FIG. 3 is a diagram illustrating an example of an imaging apparatus according to an embodiment of the present disclosure. With reference to FIG. 3, the case in which the imaging apparatus 200 is used indoor will be described. For example, the imaging apparatus 200 embodied as a robot may be used in an airport. In particular, when a child is missing in the airport, a guardian may apply for a service for missing children including signalment of the child through the remote control apparatus 100. The remote control apparatus 100 may transmit the spoken utterance of the user or the utterance text including the signalment of the child to the imaging apparatus 200, and the imaging apparatus 200 may photograph an image to search for the child while moving in the airport. That is, the remote control apparatus 100 may be a device positioned in an adjacent region in which user utterance is capable of being received, and the imaging apparatus 200 may be a device that is far away from the user and performs an action based on the user utterance, received from the remote control apparatus 100, but the position of the imaging apparatus 200 may not be limited thereto.

The server 300 may be a database server for providing big data required to apply various AI algorithms and data for operating the remote control apparatus 100 and the imaging apparatus 200. In the present embodiment, the server 300 may perform natural language processing on the user utterance received through the remote control apparatus 100, and may apply the generative model-based first learning model to an utterance text to generate an image having attributes corresponding to context of an utterance text. The server 300 may determine an action to be performed by the imaging apparatus 200 based on the user utterance, and may compare the generated image and the captured image to determine whether the generated image and the captured image correspond to each other. However, according to the processing capability of the remote control apparatus 100 and the imaging apparatus 200, at least some of the conversion to the aforementioned user utterance text, image generation, action determination, and comparison between the generated image and the captured image may be performed by the remote control apparatus 100 and/or the imaging apparatus 200.

The network 400 may connect the remote control apparatus 100 and the imaging apparatus 200, to the server 300. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may send and receive information by using short distance communication and/or long distance communication. The short distance communication may include Bluetooth®, radio frequency identification (RFID), infrared data association (IrDA), ultra-wideband (UWB), ZigBee, and wireless fidelity (Wi-Fi) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connection of network elements such as hubs, bridges, routers, switches, and gateways. The network 400 may include one or more connected networks, including a public network such as the Internet and a private network such as a secure corporate private network. For example, the network may include a multi-network environment. The access to the network 400 may be provided via one or more wired or wireless access networks. Further, the network 400 may support 5G communication and/or an Internet of things (IoT) network for exchanging and processing information between distributed components such as objects.

Figure 4:
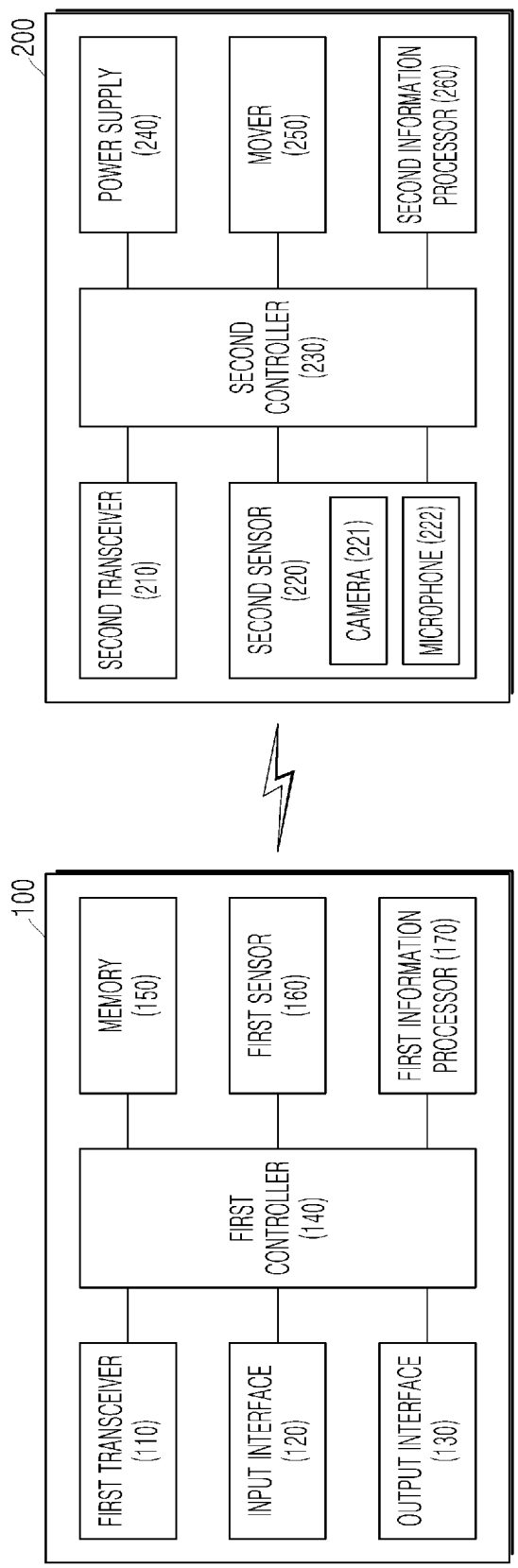
FIG. 4 is a schematic block diagram of a remote control apparatus and an imaging apparatus according to an embodiment of the present disclosure.

FIG. 4 is a schematic block diagram of a remote control apparatus and an imaging apparatus according to an embodiment of the present disclosure. Hereinafter, description overlapping with that of FIGS. 1 to 3 will be omitted.

Referring to FIG. 4, the remote control apparatus 100 may include the first transceiver 110, the input interface 120, an output interface 130, a first controller 140, a memory 150, a first sensor 160, and a first information processor 170.

The first transceiver 110 may provide a communication interface required to provide a transceiving signal between the remote control apparatus 100 and/or the imaging apparatus 200 and/or the server 300 in the form of packet data in conjunction with the network 400. The first transceiver 110 may transmit a predetermined information request signal from the remote control apparatus 100 to the server 300, may receive a response signal processed by the server 300, and may transmit the response signal to the remote control apparatus 100. The first transceiver 110 may be a device including hardware and software required to transmit and receive a signal such as a control signal or a data signal through wired and wireless connection with another network device.

Furthermore, the first transceiver 110 may support a variety of object-to-object intelligent communications, for example, Internet of things (IoT), Internet of everything (IoE), and Internet of small things (IoST), and may support, for example, machine to machine (M2M) communication, vehicle to everything (V2X) communication, and device to device (D2D) communication.

The input interface 120 may be used for an input in a user interface and may include, for example, a microphone, a manipulator, or a display. The microphone may collect surrounding noise and speech of an utterer. The microphone may receive uttered information (e.g., a driving language and uttered speech) of the user, and may transmit the uttered information to the first controller 140, and the first controller 140 may transmit the uttered information of the user to the first information processor 170. In this case, the input interface 120 may include one or more microphones, and may include a plurality of microphones in order to more accurately receive the spoken utterance of the user. Here, the plurality of microphones may be disposed to be spaced apart from each other in different positions and process the received uttering speech of the user as an electrical signal.

The manipulator may include a plurality of manipulation buttons, and may transmit a signal corresponding to the input button to the first controller 140. The manipulator may be configured with a sensor, a button, or a switch structure for recognizing a touch or push manipulation of the user. In the present embodiment, the manipulator may transmit a manipulation signal manipulated by the user in order to check or change various pieces of information related to driving of the remote control apparatus 100, displayed on a display.

The output interface 130 may be used for an output in the user interface and may include, for example, a speaker or a display.

The speaker may output the response result based on speech recognition as speech to the user.

The display may display a driving state of the remote control apparatus 100 under control of the first controller 140. Depending on the embodiment, the display 121 may form an inter-layer structure with a touch pad so as to be configured as a touch screen. In this case, the display may also be used as a manipulator to which information via a user touch is capable of being inputted. To this end, the display may be configured as a touch recognition display controller or various other input/output controllers. As an example, the touch recognition display controller may provide an output interface and an input interface between the device and the user. The touch recognition display controller may transmit and receive an electric signal to and from the first controller 140. Also, the touch recognition display controller may display a visual output to the user, and the visual output may include text, graphics, images, video, and a combination thereof. The display may be a display member such as an organic light emitting display (OLED) or a liquid crystal display (LCD) or a light emitting display (LED) capable of touch recognition, for example.

The first controller 140 may transmit a spoken utterance or utterance text of a user, inputted through the input interface 120 and/or the first transceiver 110, to the information processor 170 and the imaging apparatus 200. The first controller 140 may provide the speech recognition processing result and image generating result, received from the information processor 170, as visual information and audible information through the output interface 130. The first controller 140 may transmit the image generating result received from the information processor 170 to the imaging apparatus 200 through the first transceiver 110.

The first controller 140 may be a type of central processing device and may drive control software installed in the memory 150 to control an overall operation of the remote control apparatus 100. Here, the first controller 140 may include a device of any kind capable of processing data, such as a processor. Here, the "processor" may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), and a field programmable gate array (FPGA) may be included, but the scope of the present disclosure is not limited thereto.

In the present embodiment, the first controller 140 may perform machine learning such as deep learning on a spoken utterance of a user such that the remote control apparatus 100 outputs an optimum speech processing and image generating result, and the memory 150 may store, for example, data used in machine learning and result data.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN). For example, the deep learning structure may include a deep neural network (DNN), such as a convolutional neural network (CNN), a recurrent neural network (RNN), and a deep belief network (DBN). The deep learning structure according to the present embodiment may use various structures well known in the art. For example, the deep learning structure according to the present disclosure may include a CNN, a RNN, and a DBN. The RNN is widely used in natural language processing, and can be effectively used to process time-series data that changes over time, and may construct an ANN structure by progressively extracting higher level features through multiple layers. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN may include a model mimicking a human brain function, which is built under the assumption that when a person recognizes an object, the brain extracts the most basic features of the object and recognizes the object based on the result of complex calculations in the brain.

Further, the artificial neural network may be trained by adjusting weights of connections between nodes (if necessary, adjusting bias values as well) so as to produce a desired output from a given input. Furthermore, the artificial neural network may continuously update the weight values through training. Furthermore, a method of back propagation, for example, may be used in the learning of the artificial neural network.

The memory 150, which may store a variety of information required for operating the remote control device 100 and store control software for operating the remote control device 100, may include a volatile or non-volatile recording medium. For example, a preset wake-up word for determining the presence of a wake-up word in the spoken utterance of the user may be stored in the memory 150. The wake-up word may be set by a manufacturer. For example, "Hi, LG" may be set as the wake-up word, but the user may change the wake-up word. The wake-up word may be inputted in order to activate the remote control device 100, and the remote control device 100 that has recognized the wake-up word uttered by the user may switch to a voice recognition activation state.

Furthermore, the memory 150 may store the utterance information (wake-up word and spoken utterance) of the user received via the input interface 120, may store information detected by the first sensor 160, and may store information processed by the information processor 170.

The memory 150 may be connected to one or more processors and may store codes that cause the processor to control the remote control apparatus 100 when the codes are executed by the processor.

The memory 150 may store a command to be executed by the first information processor 170, for example, a command for converting the spoken utterance of the user, including a speech command, into a user utterance text, a command for converting the user utterance text into a feature vector, a command for estimating attention with respect to a feature vector of the user utterance text, a command for generating the user utterance text as an image, or a command of classifying the generated image and a training image and determining whether a corresponding image is the training image. The memory 150 may store a command or the like for performing syntactic analysis or semantic analysis on the user utterance text, searching for a domain to which the user utterance text belongs and intent of the user utterance text, and searching for one or more named entities as a result of the named entity recognition included in the user utterance text. In addition, the memory 150 may store therein various information processed by the first information processor 170.

Here, the memory 150 may include a magnetic storage media or a flash storage media. However, the present disclosure is not limited thereto. The memory 150 may include a built-in memory and/or an external memory, and may include a storage, for example, a volatile memory such as a DRAM, an SRAM, or an SDRAM, a non-volatile memory such as a one time programmable ROM (OTPROM), a PROM, an EPROM, an EEPROM, a mask ROM, a flash ROM, a NAND flash memory, or a NOR flash memory, a flash drive such as an SSD, a compact flash (CF) card, an SD card, a Micro-SD card, a Mini-SD card, an Xd card, or a memory stick, or a storage device such as an HDD.

The first sensor 160 may include various sensors configured to sense the condition around of the remote control device 100. The first sensor 160 may include a proximity sensor (not shown) and an image sensor (not shown). The proximity sensor may acquire location data of an object (for example, the user) located around the remote control device 100 by using infrared rays or the like. Furthermore, the location data of the user acquired by the proximity sensor may be stored in the memory 150.

The image sensor may include a camera (not shown) capable of capturing an image of the surroundings of the remote control device 100, and for image-capturing efficiency, a plurality of cameras may be installed. For example, each camera may include an image sensor (for example, a CMOS image sensor) which includes at least one optical lens and a plurality of photodiodes (for example, pixels) forming an image using the light passed through the optical lens, and may include a digital signal processor (DSP) for forming an image based on signals outputted from the photodiodes. The digital signal processor may generate not only a static image but also a video formed of frames of static images. The image captured and obtained by the camera serving as the image sensor may be stored in the memory 150.

In the present embodiment, although the sensor 160 is described as the proximity sensor and the image sensor, the exemplary embodiment is not limited thereto. The sensor 160 may include any sensors capable of sensing the surrounding situation of the speech processing apparatus 100, for example, including at least one of a Lidar sensor, a weight sensing sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a microphone, a battery gauge, an environment sensor (for example, a barometer, a hygrometer, a thermometer, a radiation sensor, a thermal sensor, or a gas sensor), and a chemical sensor (for example, an electronic nose, a healthcare sensor, or a biometric sensor). In the present embodiment, the remote control device 100 may combine various forms of information sensed by at least two of the above-mentioned sensors, and use the combined information.

The first information processor 170 may convert the spoken utterance of the user into an utterance text, or may receive the utterance text, and may apply a generative model-based first learning model to the utterance text to generate an image having attributes corresponding to context of the utterance text, and may externally transmit the image and the utterance text. The first information processor 170 may convert the utterance text into a word vector and a sentence vector, may extract word attention and sentence attention from the word vector and the sentence vector, respectively, and may generate an image based on the word attention and the sentence attention in the generative model-based first learning model. The first information processor 170 may estimate two or more intents in the utterance text, may apply a weight to the intent for generating an image, among the two or more intents, and may estimate the word attention and the sentence attention based on the weight.

In the present embodiment, the first information processor 170 may perform learning in conjunction with the first controller 140 or may receive a learning result from the first controller 140. In the present embodiment, as shown in FIG. 4, the first information processor 170 may be included outside the first controller 140 or inside the first controller 140 and may operate as the first controller 140, or may be included inside the server 300 of FIG. 2. Hereinafter, the first information processor 170 will be described in detail with reference to FIGS. 5 and 6.

Referring to FIG. 4, the imaging apparatus 200 may include a second transceiver 210, the second sensor 220, a second controller 230, a power supply 240, a mover 250, and a second information processor 260.

The second transceiver 210 may provide a communication interface required to provide a transceiving signal between the imaging apparatus 200 and/or the remote control apparatus 100 and/or the server 300 in the form of packet data in conjunction with the network 400. The second transceiver 210 may transmit a predetermined information request signal from the imaging apparatus 200 to the server 300, may receive a response signal processed by the server 300, and may transmit the response signal to the imaging apparatus 200. The second transceiver 210 may be embodied in the same way as the first transceiver 110 of the aforementioned remote control apparatus 100, and thus a detailed description thereof is omitted.

The second sensor 220 may include a camera 221 and a microphone 222, wherein the camera 221 may photograph images of, for example, the surrounding environment and an utterer, and the microphone 222 may collect the surrounding noise and speech of the utterer. In particular, in the present embodiment, the camera 221 may capture an image of the remote control apparatus 100 and/or the server 300, or an image of an object (the human, an animal, or an object) requested by the user. That is, the camera 221 may include, for example, an object recognition function and a face recognition function. The second sensor 220 may be embodied in the same way as the first sensor 160 of the aforementioned remote control apparatus 100, and thus a detailed description thereof will be described.

The second controller 230 may receive the uttered speech or an utterance text of the user through the second sensor 220 and/or the second transceiver 210. The second controller 230 may receive a first input including the uttered speech or text of the user from the remote control apparatus 100 through the second transceiver 210. The second controller 230 may receive a second input including the first image from the remote control apparatus 100 through the second transceiver 210. Here, the first image may be an image acquired by applying the generative model-based first learning model to the first input and may be an image having attributes corresponding to the context of the first input.

The second controller 230 may capture at least one second image through the camera 221 based on the first input. The second controller 230 may compare the first image and the second image and may transmit the second image to the remote control apparatus 100 and/or the server 300 as the comparison result The second controller 230 may execute control software installed in a storage (not shown) to control the entirety of the imaging apparatus 200 as a type of central processing apparatus. Here, the second controller 230 may include a device of any kind capable of processing data, such as a processor. In the present embodiment, the second controller 230 may perform machine learning such as deep learning on the spoken utterance of a user so that the imaging apparatus 200 outputs the optimum speech processing and image classification result, and a storage may store data or result data used in machine learning. The second controller 230 may be embodied in the same way as the first controller 140 of the aforementioned remote control apparatus 100, and thus a detailed description thereof will be described.

A storage (not shown) may store various pieces of information required for an operation of the imaging apparatus 200, may store control software for operating the imaging apparatus 200, and may include a volatile or non-volatile recording medium.

The storage may store information detected by the second sensor 220, and may store information processed by the second information processor 260. The storage may be connected to one or more processors, and may store codes that cause the processor to control the imaging apparatus 200 when the codes are executed by the processor.

The storage may store a command to be executed by the second information processor 260, for example, a command for converting the user utterance text into a feature vector, a command for performing syntactic analysis or semantic analysis on a feature vector of the user utterance text and estimating intent of the user utterance text, a command for performing an action based on the user utterance text, or a command for comparing the generated image and the captured image to determine whether the generated image and the captured image correspond to each other. The storage may store a command for extracting user attention, a command for performing syntactic analysis or semantic analysis on the user utterance text, searching for a domain to which the user utterance text belongs, and searching for one or more named entities as a result of the named entity recognition included in the user utterance text. The storage may store various pieces of information processed by the second information processor 260.

The storage may be embodied in the same way as the memory 150 of the remote control apparatus 100, and a detailed description thereof is omitted.

In the present embodiment, simple speech recognition may be performed by the imaging apparatus 200, and high level speech recognition such as natural language processing may be performed by the server 300. For example, when a word uttered by the user is a preset wake-up word, the imaging apparatus 200 may switch to a state for receiving a spoken utterance as a speech command. Here, the imaging apparatus 200 may perform the speech recognition process up to a stage where it is determined whether the wake-up word has been inputted, and the rest of the speech recognition process for the spoken sentence may be performed through the server 300. Since system resources of the imaging apparatus 200 may be limited, natural language recognition and processing, which are relatively complex, may be performed by the server 300.

The power supply 240 may perform a function of supply power to operate the imaging apparatus 200. The power supply 240 may supply power from its own battery, or by being connected to an external power source.

The mover 250 may perform a function of moving the imaging apparatus 200 or equipment with the imaging apparatus 200 installed therein.

The second information processor 260 may receive a first input including text or speech and a second input including the first image, and may capture at least one second image based on the first input. The second information processor 260 may compare the first image and the second image, and may transmit the second image in response to the comparison result. The second information processor 260 may apply a machine learning-based second learning model trained to estimate similarity of images using two images as an input, to the first image and the second image. The second information processor 260 may extract feature vectors from the first image and the second image, respectively, and may compare the feature vectors extracted from the first image and the second image.

In the present embodiment, the second information processor 260 may perform learning in conjunction with the second controller 230 or may receive the learning result from the second controller 230. In the present embodiment, as shown in FIG. 4, the second information processor 260 may be included outside the second controller 230 or may be included inside the second controller 230 to operate like the second controller 230 or may be included inside the server 300 of FIG. 2. Hereinafter, the second information processor 260 will be described in detail with reference to FIGS. 5 and 6.

Figure 5:
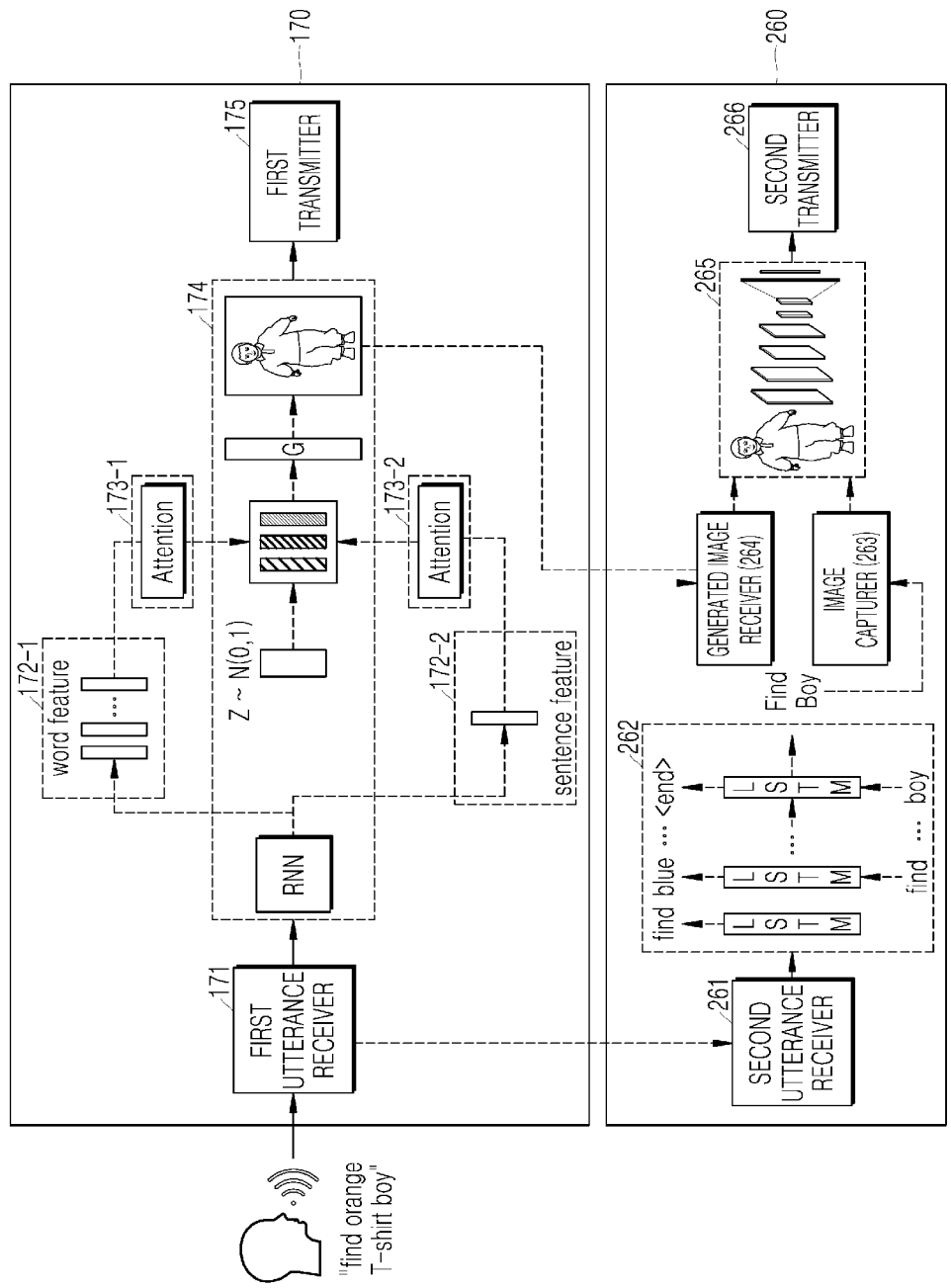
FIG. 5 is a diagram for detailed explaining a remote control apparatus and an imaging apparatus according to an embodiment of the present disclosure.

FIG. 5 is a diagram explaining in detail a remote control apparatus and an imaging apparatus according to an embodiment of the present disclosure. Hereinafter, description overlapping with that of FIGS. 1 to 4 will be omitted.

Referring to FIG. 5, the first information processor 170 of the remote control apparatus 100 may include a first utterance receiver 171, vector converters 172-1 and 172-2, attention extractors 173-1 and 173-2, an image generator 174, and a first transmitter 175. In an alternative embodiment, the first information processor 170 may include one or more processors. In an alternative embodiment, the first utterance receiver 171 to the first transmitter 175 may correspond to one or more processors. In an alternative embodiment, the first utterance receiver 171 to the first transmitter 175 may correspond to a software component configured to be executed by one or more processors.

The first utterance receiver 171 may convert the spoken utterance of the user into an utterance text or may receive the utterance text. That is, the first utterance receiver 171 may receive the spoken utterance of the user and may convert the spoken utterance of the user into text, or may receive the converted text. For example, when receiving a spoken utterance of a user of "find orange T-shirt boy", the first utterance receiver 171 may convert the spoken utterance into text.

The image generator 174 may apply a generative model-based first learning model to the utterance text data to generate an image having attributes corresponding to context of the text. Here, the first learning model may be a learning model trained to output an image having attributes corresponding to the context of the input using text or speech as an input, and in the present embodiment, may be a generative model-based learning model including a generative adversarial network (GAN). In particular, in the present embodiment, the image generator 174 may use a generative model-based first learning model for text-to-image conversion and, to this end, may perform a procedure of converting the utterance text data into a vector to estimate attention.

That is, the image generator 174 may include the vector converters 172-1 and 172-2 and the attention extractors 173-1 and 173-2. In the present embodiment, the vector converters 172-1 and 172-2 may be classified into the first vector converter 172-1 for converting the utterance text data into the word vector, and the second vector converter 172-2 for converting the utterance text data into the sentence vector.

In the present embodiment, the attention extractors 173-1 and 173-2 may be classified into the first attention extractor 173-1 for estimating the word attention from the word vector, and the second attention extractor 173-2 for estimating the sentence attention from the sentence vector.

For example, in the present embodiment, the first learning model may include a recurrent neural networks (RNN) algorithm. The RNN may be one type of artificial neural network with a directed cycle formed by connecting hidden nodes via a directed edge. That is, the RNN may be a model appropriate for processing data that is sequentially represented, such as speech or character, but when related information and a point using the information are far away, a backpropagation gradient may be gradually reduced and learning performance may be degraded. Thus, in the present embodiment, a procedure of extracting attention may be performed. In addition, when the vector converters 172-1 and 172-2 perform a conversion only into the word vector, sentence word order and meaning may be disregarded. Thus, in the present embodiment, the second vector converter 172-2 may convert the utterance text data into the sentence vector, and the second attention extractor 173-2 may estimate attention at a sentence level.

In more detail, the vector converters 172-1 and 172-2 may perform encoding for generating a keyword mapping text by mapping each of a plurality of words to a preset keyword using an utterance text including the plurality of words as an input. That is, the vector converters 172-1 and 172-2 may be an encoder.

The attention extractors 173-1 and 173-2 may input the keyword mapping text to an attention model to generate attention information for each keyword. The attention extractors 173-1 and 173-2 may perform decoding for outputting two or more utterance intents corresponding to the utterance text using the attention information. That is, the attention extractors 173-1 and 173-2 may include a decoder.

The vector converters 172-1 and 172-2 may generate and output a keyword mapping text by mapping each of a plurality of words to a preset keyword stored in a database (not shown) using an utterance text including the plurality of words as an input. In the present embodiment, the database may store a keyword to be mapped to a word included in the utterance text. Here, the keyword may indicate a corresponding intent. For example, when the utterance text includes a word such as finding, find, or finding, the vector converters 172-1 and 172-2 may access the database, may select "find" as the keyword, and may map the keyword "find" to a corresponding word of the user utterance text.

Along with generation of the keyword mapping text of the vector converters 172-1 and 172-2, more feature information may be transmitted to the attention extractors 173-1 and 173-2, thereby enhancing intent output performance of the attention extractors 173-1 and 173-2.

The attention extractors 173-1 and 173-2 may input the keyword mapping text to an attention model (not shown) to generate attention information on each keyword. The attention model may indicate a model for generating attention information corresponding to keyword feature information using a pre-trained neural network. Here, the attention information may be information indicating intent to which a weight needs to be applied, among two or more intents output after a decoding procedure.

In the attention model, for example, an RNN encoder-decoder model, a position (a keyword) to which attention needs to be paid may be determined using encoding generated using a hidden state of an encoder and a hidden state of a decoder that has been generated thus far, as an input. The attention model may allocate a higher weight (attention information) to the position (the keyword) to which attention needs to be paid. That is, the attention model may output different pieces of attention information for respective keywords depending on a position of a keyword that functions as an important function to generate the current output.

In the present embodiment, in the image generator 174, the generative model-based first learning model may generate an image based on the word attention and the sentence attention. The image generator 174 may estimate two or more intents in the utterance text, may apply a weight to the intent for generating an image, among the two or more intents, and may estimate the word attention and the sentence attention based on the weight to generate an image.

The image generator 174 may perform syntactic analysis or semantic analysis on the utterance text to analyze a domain and intent for the spoken utterance of the user. Here, the syntactic analysis may classify the utterance text in a syntactic unit (e.g., a word, a phrase, or a morpheme) and may recognize a syntactic element in the classified unit. In the present embodiment, the syntactic analysis may include a technology of tokenizing the utterance text and classifying the utterance text into words. In addition, the semantic analysis may be performed using semantic matching, rule matching, formula matching, and the like. In the present embodiment, the domain may include information indicating the imaging apparatus 200 to be operated by a user, control function information for controlling the imaging apparatus 200, and the like. In the present embodiment, the intent may include information indicating a detailed operation performed through a control function or the like of the imaging apparatus 200 included in the domain, for example, information on a person to be found. For example, when the utterance text is "find orange T-shirt boy", in the present embodiment, "a moveable robot" and "a service for missing children" may be outputted as the domain, and "orange" and "boy" may be outputted as the intent.

That is, the image generator 174 may allocate a weight to, for example, "orange" or "boy", and may also additionally combine "T-shirt" to generate an image. The image generator 174 may convert a vector in a sentence level, and similarity between sentences may be calculated in further consideration of a semantic element of a sentence, thereby minimizing information loss. That is, in the present embodiment, there may be a plurality of sentences, and a main sentence may be extracted from the plurality of sentences.

The first transmitter 175 may externally transmit an image generated by the image generator 174 and an utterance text received from the first utterance receiver 171. In the present embodiment, the first transmitter 175 may transmit the generated image and an utterance text to the imaging apparatus 200 and/or the server 300.

In the present embodiment, the first information processor 170 may further include a discriminator 176. In an alternative embodiment, the discriminator 176 may correspond to one or more processors. In an alternative embodiment, the discriminator 176 may correspond to a software component configured to be executed by one or more processors.

Figure 6:
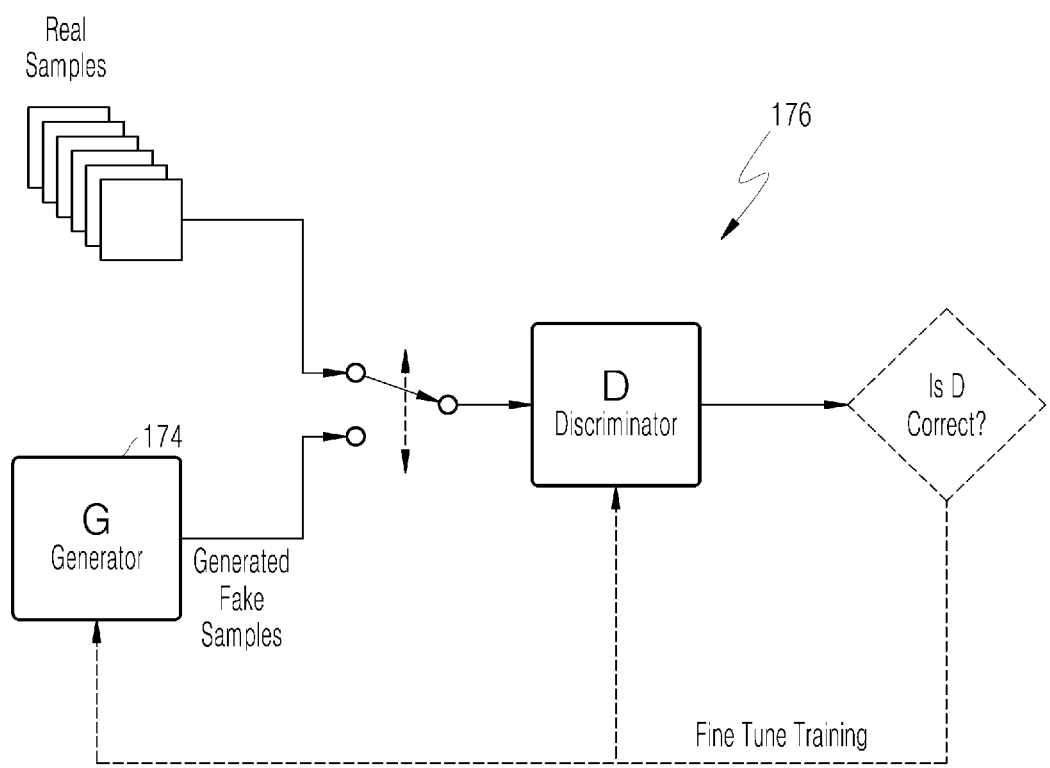
FIG. 6 is a diagram illustrating an example of a discriminator of a remote control apparatus according to an embodiment of the present disclosure.

FIG. 6 is a diagram illustrating an example of a discriminator of a remote control apparatus according to an embodiment of the present disclosure. Referring to FIG. 6, the discriminator 176 may input a discriminative model by alternating a generated image or a trained image (an actual image) in the image generator 174. The discriminative model may be a learning model for classifying whether a trained image is input, and may output the true result when determining the trained image to be inputted. The discriminator 176 may feedback the output result of the discriminative model to the image generator 174. In this case, when the learning model output result is feedback as false, the image generator 174 may generate a new image and may update an output of the discriminative model in a direction (vector) in which an output is true. Thus, in the present embodiment, while false data formed through the generative model of the image generator 174 copies true data (in-domain), a region that is not covered by trained data may be compensated for. That is, in the present embodiment, a generator for generating new data and a discriminator for evaluating the data may oppose each other, and may form a new virtual image that resembles a true image after contention for enhancing each performance respectively.

Referring to FIG. 5, the second information processor 260 of the imaging apparatus 200 may include a second utterance receiver 261, an intent discriminator 262, an image capturer 263, a generated image receiver 264, a comparator 265, and a second transmitter 266. In an alternative embodiment, the second information processor 260 may include one or more processors. In an alternative embodiment, the second utterance receiver 261 to the second transmitter 266 may correspond to one or more processors. In an alternative embodiment, the second utterance receiver 261 to the second transmitter 266 may correspond to a software component configured to be executed by one or more processors.

The second utterance receiver 261 may receive a first input including text or speech data. The second utterance receiver 261 may receive a spoken utterance of a user, may convert the spoken utterance of a user into an utterance text, or may receive the converted utterance text. For example, when receiving the spoken utterance of the user, "find orange T-shirt boy", the second utterance receiver 261 may convert the spoken utterance of a user into utterance text.

The intent discriminator 262 may apply an intent classification learning model based on a natural language processing artificial neural network to the first input. Here, the natural language processing artificial neural network may be a natural language processing artificial neural network trained to output two or more intents from the first input. In the present embodiment, the intent classification learning model based on the natural language processing artificial neural network may be, for example, an RNN-based long short term memory (LSTM) model. The LSTM may compensate for an issue in terms of long term dependency of the RNN, and may include four interactive structures without a single network layer. In the present embodiment, the intent classification learning model based on the natural language processing artificial neural network may be a sequence-sequence model using a bidirectional LSTM network, and may fill a slot and may simultaneously predict the intent. For example, when the sentence "find orange T-shirt boy" is given, a task may appropriately output or fill slots {action: find people} and {who: boy}.

Thus, the imaging apparatus 200 may obtain a speech input uttered by the user, may analyze the speech input to classify an instruction indicated by the speech input into at least one action, and may determine a final action via analysis of user intent of the classified action. The action may be a task performed by the imaging apparatus 200 in order to perform an instruction indicated by the speech input and the speech input may include a named entity as an action target. The imaging apparatus 200 may analyze the speech input to derive the instruction indicated by the speech input. The instruction indicated by the speech input may include a target of the instruction and content of the instruction. Here, the target of the instruction may correspond to the named entity and the content of the instruction may correspond to the action.

In an alternative embodiment, an instruction indicated by one speech input may be classified into actions for a plurality of domains. The domain may refer to a functional scope of the action. For example, an instruction of 'Find A' may be classified into actions for various domains for supporting a search function. For example, all of person finder, music, web, memo, address list, application, home appliance control, weather, message, and place may correspond to a domain for supporting the search function. The instruction of 'Find A' may be classified into 'Find person A' (first action) or 'Find place A' (second action). As such, a speech input to be classified into a plurality of actions may be referred to as ambiguous utterance.

In this case, the imaging apparatus 200 may perform user intent analysis in order to determine a final action for ambiguous speech input to be classified into a plurality of actions. User intent analysis in a speech recognition service may refer to classification of speech input uttered by the user into one particular action out of a predefined action list. The user intent analysis may contribute to a response corresponding to the intent of the user utterance. That is, the imaging apparatus 200 may select one action determined to be the most appropriate for the user intent among a plurality of candidate actions as a final action using the user intent analysis. For example, one action may be lastly selected among first and second actions obtained as a classification result in the aforementioned example according to a domain intended by the user according to the instruction 'Find A'.

In the present embodiment, the user may determine the intended domain as person finder, and may capture at least one second image based on the first input through the camera 221. That is, the image capturer 263 may capture the second image based on an output of the intent classification learning model, and the second image may be an image of people in a setting region. For example, when an intent of finding a boy in an airport is analyzed, the imaging apparatus 200 may capture an image of boys while moving in the airport.

That is, the image capturer 263 may capture at least one second image based on the first input, and may capture the second image based on the intent classification learning model.

The generated image receiver 264 may receive the second input including the first image. That is, the generated image receiver 264 may receive an image generated based on the user utterance from the remote control apparatus 100.

The comparator 265 may compare the first image with the second image. That is, the first image may be an image obtained by applying a generative model-based first learning model to the first input, and may be an image having attributes corresponding to context of the first input. The second image may be an image captured by the camera 221. That is, the comparator 265 may compare the image generated based on the user utterance with the image captured by the camera 221 and may determine whether the images correspond to each other.

The comparator 265 may use two images as an input and apply the machine learning-based second learning model trained to estimate the similarity of the first and second images. For example, a siamese neural network may be applied to the comparator 265. The siamese neural network may be a neural network to be used in a recognizer having insufficient training data for each category. The siamese neural network may learn measurement of similarity from data. The siamese neural network may include a comparison module that receives an output from two or more neural networks (sub networks) and neural networks that share at least a portion of a weight. At least two images may be input to the siamese neural network. The siamese neural network may output a result of determining the similarity between two input images. In order to process the images, the siamese neural network may include two convolutional neural networks that receive the images. The two convolutional neural networks that receive the image in the siamese neural network may share at least a portion of a weight. The sub networks included in the siamese neural network may share a weight by a weight sharing module, and the sub networks may share the weight, and thus, the siamese neural network may extract a common weight with respect to the two input data and may compare the two input data.

The comparator 265 may extract feature vectors from the first and second images, respectively, and may compare the feature vectors extracted from the first image and the second image. That is, the comparator 265 may extract the feature vector of the first image that is the generated image, may extract the feature vector of the second image that is the photographed image, and then may compare similarities as a vector value. For example, the similarity value may be extracted as 0.0 to 1.0, and may be extracted as a value close to 1.0 depending on a degree of similarity. Thus, the comparator 265 may compare each of the plurality of captured images with the generated image to extract a similarity value, and may output the same result (true) with respect to the captured image extracted at a value above a reference similarity value. The reference similarity value may be preset as a reference value for determining that the compared images are the same.

The second transmitter 266 may transmit the second image in response to the comparison result of the first and second images. That is, when determining that the generated image and the captured image are the same as the comparison result, the second transmitter 266 may transmit the captured image to the remote control apparatus 100 and/or the server 300.

Figure 7:
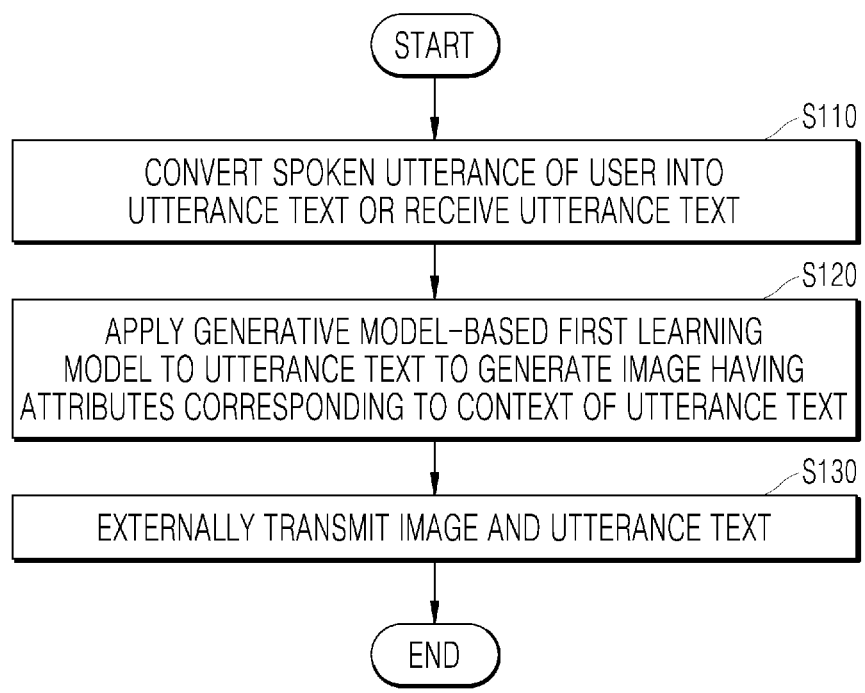
FIG. 7 is a flowchart for explaining a control method of a remote control apparatus according to an embodiment of the present disclosure.

FIG. 7 is a flowchart for explaining a control method of a remote control apparatus according to an embodiment of the present disclosure. Description overlapping with that of FIGS. 1 to 6 will be omitted.

Referring to FIG. 7, in operation S110, the remote control apparatus 100 may convert the spoken utterance of the user into an utterance text, or may receive the utterance text. That is, the remote control apparatus 100 may receive the spoken utterance of the user and may convert the spoken utterance of the user into an utterance text, or may receive the converted utterance text. For example, when receiving the user utterance of "find orange T-shirt boy", the remote control apparatus 100 may convert the spoken utterance of the user into an utterance text.

In operation S120, the remote control apparatus 100 may apply the generative model-based first learning model to the utterance text to generate an image having attributes corresponding to context of the utterance text. Here, the first learning model may be a first learning model trained to output an image having attributes corresponding to the context of the input using the text or the speech as an input, and in the present embodiment, may be a generative model-based first learning model including a generative adversarial network (GAN). In particular, in the present embodiment, the remote control apparatus 100 may use the generative model-based first learning model for text-to-image conversion, and to this end, may perform a procedure of converting the utterance text into a vector and extract attention. That is, the remote control apparatus 100 may calculate word and sentence information with attention to generate an optimized image for an input sentence. In this case, the remote control apparatus 100 may include a discriminator trained to discriminate between a true image (an actual image, a trained image, or a labeled image) and a fake image (a generated image). That is, the remote control apparatus 100 may be trained to fool the discriminator to form the true image, and thus, as the remote control apparatus 100 performs learning, an image that gradually resembles the real image may be generated. In other words, the remote control apparatus 100 may include a generative model that receives an input as text data and outputs the data as an image, and the generative model may have another discriminative model therein, and thus a real image (an answer label having a label) and an image generated by the generative model may be classified, and the generative model may be trained while classification and generation are repeatedly performed. After converting the input text into a separate word and a sentence vector, the remote control apparatus 100 may convert an attention parameter to each of the separate words and the sentence parameters to form an optimum vector that sufficiently contains the meaning in the text and may input the vector to the generative model.

In operation S130, the remote control apparatus 100 may externally transmit the image and the utterance text. That is, the remote control apparatus 100 may externally transmit the utterance text and the image generated based on the utterance text, and may transmit the same to, for example, the imaging apparatus 200 and/or the server 300.

Figure 8:
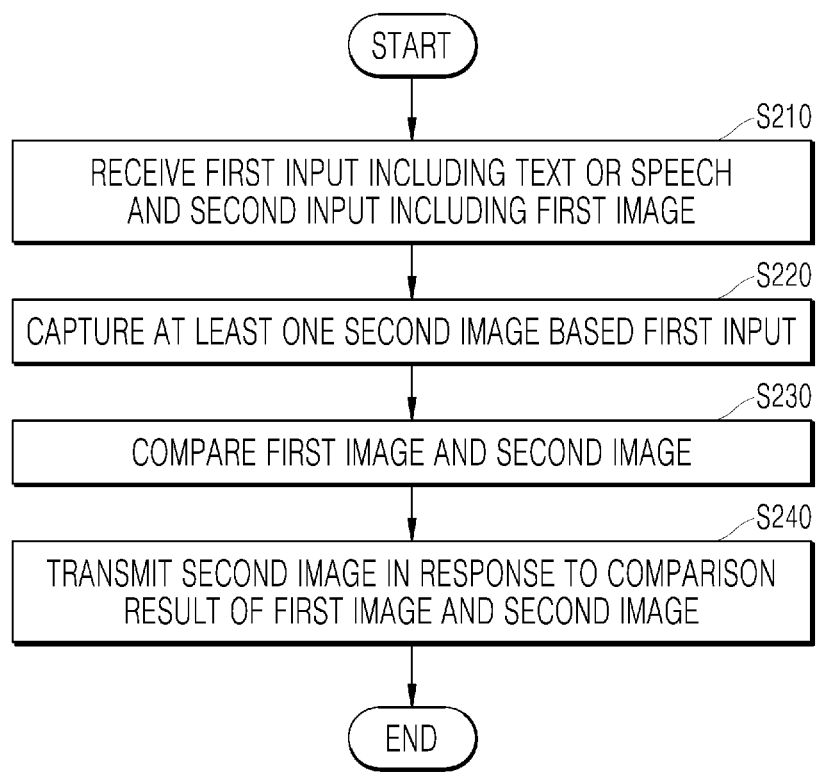
FIG. 8 is a flowchart for explaining a control method of an imaging apparatus according to an embodiment of the present disclosure.

FIG. 8 is a flowchart for explaining a control method of an imaging apparatus according to an embodiment of the present disclosure. Hereinafter, description overlapping with that of FIGS. 1 to 7 will be omitted.

Referring to FIG. 8, in operation S210, the imaging apparatus 200 may receive a first input including text or speech data and a second input including a first image. That is, the imaging apparatus 200 may receive the first input including the text or speech data. The imaging apparatus 200 may receive the spoken utterance of the user, and may convert the spoken utterance of the user into the utterance text or may receive the converted utterance text. For example, when receiving the user utterance of "find orange T-shirt boy", the imaging apparatus 200 may convert the spoken utterance of the user into the utterance text or may receive the utterance text. The imaging apparatus 200 may receive the second input including the first image from the remote control apparatus 100. That is, the imaging apparatus 200 may receive the image generated based on a user utterance from the remote control apparatus 100. However, in some embodiments, the first input and the second input may also be received from the server 300.

In operation S220, the imaging apparatus 200 may capture at least one second image based on the first input. That is, the imaging apparatus 200 may apply an intent classification learning model based on a natural language processing artificial neural network to the first input to analyze the intent of the first input. Here, the natural language processing artificial neural network may be a natural language processing artificial neural network trained to output at least two or more intents from the first input. In other words, the imaging apparatus 200 may obtain a speech input uttered by the user, may analyze the speech input, may classify an instruction indicated by the speech input into at least one action, and may determine a final action among the classified actions via user intent analysis. In the present embodiment, the user may determine an intended domain as person finder, and may capture at least one second image based on first input through the camera 221. That is, the imaging apparatus 200 may capture the second image based on an output of the intent classification learning model, and the second image may be an image of people within a setting region. For example, when the intent to search for a body in an airport is analyzed, the imaging apparatus 200 may capture an image of boys while moving in the airport.

In operation S230, the imaging apparatus 200 may compare the first image and the second image. In this case, the first image may be an image acquired by applying a generative model-based first learning model to the first input, and may be an image having attributes corresponding to context of the first input. The second image may be an image captured by the camera 221. That is, the imaging apparatus 200 may compare the image generated based on the user utterance and the image captured by the camera 221 to determine whether the images are the same. The imaging apparatus 200 may apply, to the first and second images, the machine learning-based second learning model trained to estimate similarity of images using two images as an input, and compare the first image and the second image. The imaging apparatus 200 may extract feature vectors from the first image and the second image, respectively, and may compare the extracted feature vectors from the first image and the second image to compare the first image and the second image.

The imaging apparatus 200 may include an intent classifier for classifying intent of a text and an image classifier for comparing images. That is, the intent classifier may extract the meaning of an input sentence (a user instruction), and the imaging apparatus 200 may perform a specific action based on the extracted intent. The image classifier may label an output image of a generative model and may compare the output image with an output result of the image classifier. That is, the image classifier may analyze whether an image (e.g., an image captured by a camera) received as an input is the same as an image labeled via calculation of a neural network (neural net) in a classifier.

In operation S240, the imaging apparatus 200 may transmit the second image in response to the comparison result of the first image and the second image. That is, as the comparison result of the generated image and the captured image, the imaging apparatus 200 may transmit the captured image to the remote control apparatus 100 and/or the server 300 when determining that the images are the same.

According to an embodiment of the present disclosure, an AI algorithm and/or a machine learning algorithm installed in a device may be executed while a generative model-based device and a discriminative model-based device that are positioned at different places perform remote control while interacting with each other, thereby effectively processing a speech instruction.

The generative model-based device may generate an image based on the spoken utterance of a user, may match an image captured by the discriminative model-based device with an image generated by the generative model, may provide the matching result to the generative model-based device, and thus devices positioned far away from each other may be effectively controlled to enhance user satisfaction.

The generative model-based device may extract attention from the utterance text to generate an image having attributes corresponding to context, thereby enhancing the accuracy of the image generating result.

The generative model-based device may generate an image based on a spoken utterance of a user, and may repeatedly a procedure of discriminating an actual image and an image generated through an internal discrimination model to learn the generative model, and thus may compensate for a region that is not covered by training data, thereby enhancing performance of the generative model.

The discriminative model-based device may perform text classification and image classification based on the spoken utterance of a user, may combine the performing results, and may perform a specific intended operation to efficiently and accurately determine the instruction intent of the user using as much information as possible.

The remote control apparatus and the imaging apparatus may be controlled through 5G network-based communication, and thus data may be rapidly processed, thereby further enhancing performance of a control system of the remote control apparatus and the imaging apparatus.

The above-described embodiments of the present disclosure can be implemented as a computer program that can be executed on a computer using various components, and the computer program can be stored in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (particularly in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method of controlling a remote control apparatus, the method comprising:

converting a spoken utterance of a user into an utterance text or receiving the utterance text;

applying a generative model-based first learning model to the utterance text and generating an image having attributes corresponding to a context of the utterance text; and externally transmitting the image and the utterance text, wherein the generating the image comprises:

converting the utterance text into a word vector and a sentence vector;

estimating word attention and sentence attention from the word vector and the sentence vector, respectively; and generating the image based on the word attention and the sentence attention by the generative model-based first learning model, wherein the estimating the word attention and the sentence attention comprises:

estimating two or more intents based on the word vector and the sentence vector in an utterance text;

applying a weight to an intent for generating an image, among the two or more intents; and estimating the word attention and the sentence attention based on the weight.

2. The method of claim 1, wherein the generative model-based first learning model is a first learning model trained to output an image having attributes corresponding to a context of a text or speech input, and is a generative model-based learning model including any one of a generative adversarial network (GAN), a conditional GAN (cGAN), a deep convolution GAN (DCGAN), an auto-encoder, or a variational auto-encoder (VAE).

3. A method of controlling an imaging apparatus, the method comprising:

receiving a first input including text or speech data and a second input including a first image;

capturing at least one second image based on the first input;

comparing the first image and the at least one second image; and transmitting the at least one second image in response to a comparison result of the first image and the at least one second image, wherein the first image is an image obtained by applying a generative model-based first learning model to the first input, and is an image having attributes corresponding to a context of the first input, wherein the first image is an image generated based on a word attention and a sentence attention respectively estimated from a word vector and a sentence vector of the first input by the generative model-based first learning model, and wherein the estimated word attention and sentence attention are estimated based on a weight assigned to an intent for generating an image among two or more intentions estimated based on the word vector and the sentence vector for the first input.

4. The method of claim 3, wherein the comparing the first image and the at least one second image comprises applying a machine learning-based second learning model trained to estimate similarity of images using two images as an input, to the first image and the at least one second image.

5. The method of claim 3, wherein the comparing the first image and the at least one second image comprises:

extracting feature vectors from the first image and the at least one second image, respectively; and comparing the feature vectors extracted from the first image and the at least one second image.

6. The method of claim 3, wherein the capturing the at least one second image comprises:

applying an intent classification learning model based on a natural language processing artificial neural network to the first input; and capturing the at least one second image based on an output of the intent classification learning model.

7. The method of claim 6, wherein the natural language processing artificial neural network is a natural language processing artificial neural network trained to output at least two or more intents from the first input.

8. A remote control apparatus comprising:

a first utterance receiver configured to convert a spoken utterance of a user into an utterance text or to receive the utterance text;

an image generator configured to apply a generative model-based first learning model to the utterance text and to generate an image having attributes corresponding to a context of the utterance text;

a first transmitter configured to externally transmit the image and the utterance text;

a vector converter configured to convert the utterance text into a word vector and a sentence vector; and an attention extractor configured to estimate word attention and sentence attention from the word vector and the sentence vector, respectively, wherein the image generator generates the image based on the word attention and the sentence attention by the generative model-based first learning model, and wherein the attention extractor estimates two or more intents in the utterance text, applies a weight to an intent for generating an image, among the two or more intents, and estimates the word attention and the sentence attention based on the weight.

9. The remote control apparatus of claim 8, wherein the generative model-based first learning model is a first learning model trained to output the image having the attributes corresponding to a context of a text or speech input, and is a generative model-based learning model including any one of a generative adversarial network (GAN), a conditional GAN (cGAN), a deep convolution GAN (DCGAN), an auto-encoder, or a variational auto-encoder (VAE).

10. An imaging apparatus comprising:

a second utterance receiver configured to receive a first input including text or speech;

a generated image receiver configured to receive a second input including a first image;

an image capturer configured to capture at least one second image based on the first input;

a comparator configured to compare the first image and the at least one second image; and a second transmitter configured to transmit the at least one second image in response to a comparison result of the first image and the at least one second image, wherein the first image is an image obtained by applying a generative model-based first learning model to the first input, and is an image having attributes corresponding to a context of the first input, wherein the first image is an image generated based on a word attention and a sentence attention respectively estimated from a word vector and a sentence vector of the first input by the generative model-based first learning model, and wherein the estimated word attention and sentence attention are estimated based on a weight assigned to an intent for generating an image among two or more intentions estimated based on the word vector and the sentence vector for the first input.

11. The imaging apparatus of claim 10, wherein the comparator applies a machine learning-based second learning model trained to estimate similarity of images using two images as an input, to the first image and the at least one second image.

12. The imaging apparatus of claim 10, wherein the comparator extracts feature vectors from the first image and the at least one second image, respectively, and compares the feature vectors extracted from the first image and the at least one second image to determine similarity of the first image and the at least one second image.

13. The imaging apparatus of claim 10, further comprising:
  an intent discriminator configured to apply an intent classification learning model based on a natural language processing artificial neural network to the first input,
  wherein the image capturer captures the at least one second image based on an output of the intent classification learning model.

14. The imaging apparatus of claim 13, wherein the natural language processing artificial neural network is a natural language processing artificial neural network trained to output at least two or more intents from the first input.

* * * * *